US012563508B2

(12) United States Patent
Liu et al.

(10) Patent No.: US 12,563,508 B2
(45) Date of Patent: Feb. 24, 2026

(54) RUNTIME DOWNLINK POWER CONFIGURATION USING CONTROL-PLANE MESSAGING

(71) Applicant: Dell Products L.P., Round Rock, TX (US)

(72) Inventors: Jia Liu, Newmarket (CA); Weihong Zhang, Ottawa (CA); Steven Ou, Kanata (CA)

(73) Assignee: Dell Products L.P., Round Rock, TX (US)

( * ) Notice: Subject to any disclaimer, the term of this patent is extended or adjusted under 35 U.S.C. 154(b) by 330 days.

(21) Appl. No.: 18/479,191

(22) Filed: Oct. 2, 2023

(65) Prior Publication Data

US 2025/0113311 A1     Apr. 3, 2025

(51) Int. Cl.
*H04W 52/52*     (2009.01)
*H04W 52/14*     (2009.01)

(52) U.S. Cl.
CPC ......... *H04W 52/52* (2013.01); *H04W 52/143* (2013.01)

(58) Field of Classification Search
CPC . H04W 52/52; H04W 52/143; H04W 52/346; H04W 52/367
See application file for complete search history.

(56) References Cited

U.S. PATENT DOCUMENTS

| | | | | |
|---|---|---|---|---|
| 2017/0202005 | A1* | 7/2017 | Madan | H04W 72/542 |
| 2024/0049131 | A1* | 2/2024 | Dimou | H04W 52/386 |
| 2024/0214272 | A1* | 6/2024 | Ying | H04L 41/0873 |
| 2024/0267981 | A1* | 8/2024 | Esswie | H04W 48/16 |

OTHER PUBLICATIONS

Telecom Infra Project, "Smart Off-Grid Power for Rural Connectivity," Copyright © 2022 Telecom Infra Project, Inc., https://telecominfraproject.com/wp-content/uploads/Smart-Off-Grid-Power-for-Rural-Connectivity-White-Paper.pdf.
O-RAN, "O-RAN WG4 Control, User and Synchronization Plane Specification, v11.00," Jun. 1, 2023.
O-RAN, "O-RAN WG4 Management Plane Specification, v11.00," Jun. 1, 2023.

* cited by examiner

*Primary Examiner* — Fayyaz Alam
(74) *Attorney, Agent, or Firm* — Amin, Turocy & Watson, LLP

(57)     ABSTRACT

The technology described herein is directed towards runtime dynamic downlink power configuration between a distributed unit and radio unit. In one O-RAN-compliant implementation, control-plane messages are used to update the downlink power without any service interruption, based on initialization information provided by management-plane messages to the distributed unit, including a radio unit's indication of support for the power change and the time (gap) needed by the radio unit to implement a power change. Based on this data, the distributed unit and radio unit (which are synchronized) change the downlink power at the same specific time (same symbol) such that the power configuration can be done during runtime without any service interruption. This is advantageous with power changes needed for Citizens Broadband Radio Service (CBRS) systems and/or for energy saving purposes, for example.

20 Claims, 11 Drawing Sheets

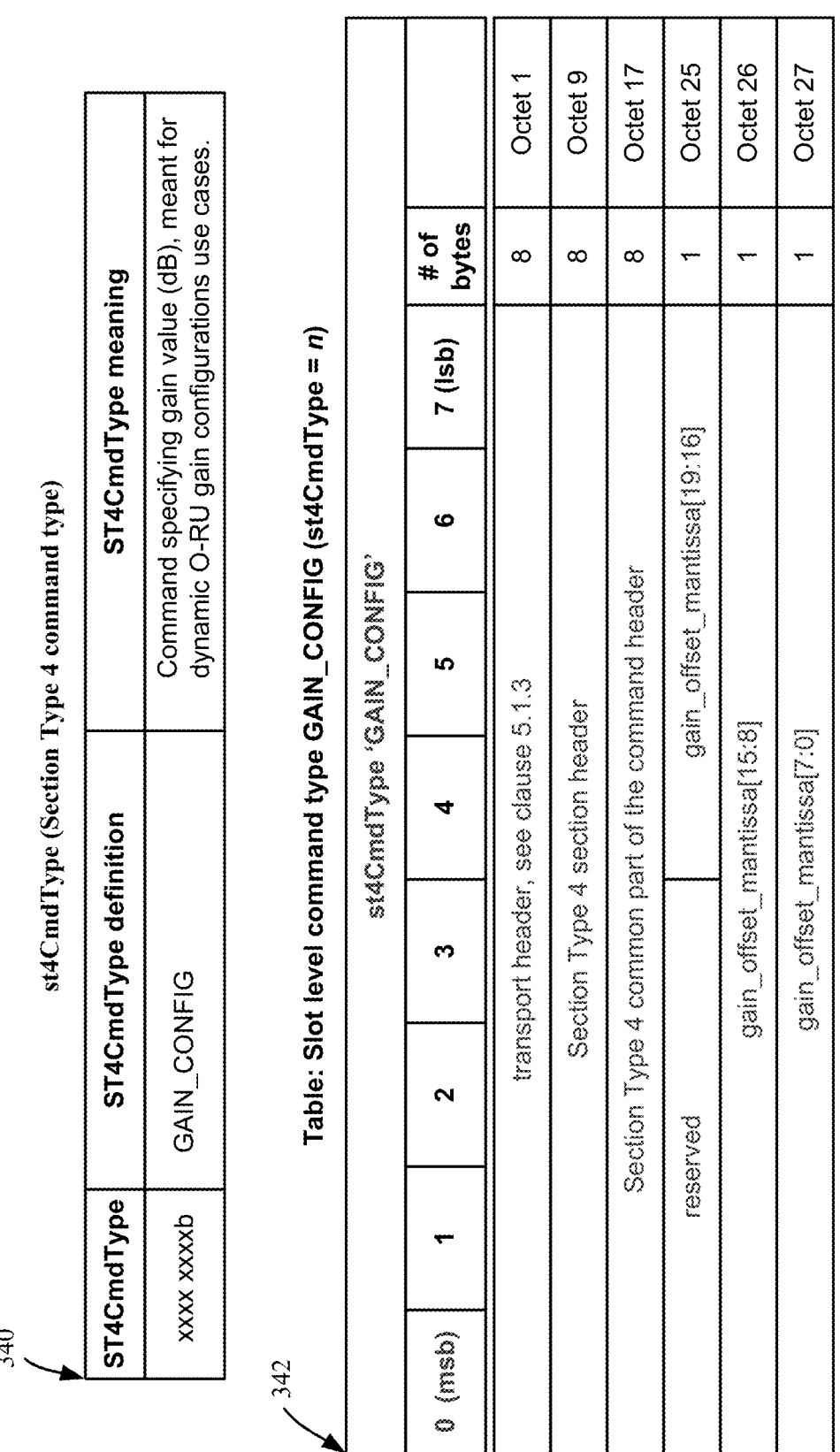

st4CmdType (Section Type 4 command type)

| ST4CmdType | ST4CmdType definition | ST4CmdType meaning |
|---|---|---|
| xxxx xxxxb | GAIN_CONFIG | Command specifying gain value (dB), meant for dynamic O-RU gain configurations use cases. |

340

Table: Slot level command type GAIN_CONFIG (st4CmdType = n)

| | | | | st4CmdType 'GAIN_CONFIG' | | | | # of bytes | |
|---|---|---|---|---|---|---|---|---|---|
| 0 (msb) | 1 | 2 | 3 | 4 | 5 | 6 | 7 (lsb) | | |
| | | | transport header, see clause 5.1.3 | | | | | 8 | Octet 1 |
| | | | Section Type 4 section header | | | | | 8 | Octet 9 |
| | | | Section Type 4 common part of the command header | | | | | 8 | Octet 17 |
| reserved | | | | | gain_offset_mantissa[19:16] | | | 1 | Octet 25 |
| | | | gain_offset_mantissa[15:8] | | | | | 1 | Octet 26 |
| | | | gain_offset_mantissa[7:0] | | | | | 1 | Octet 27 |

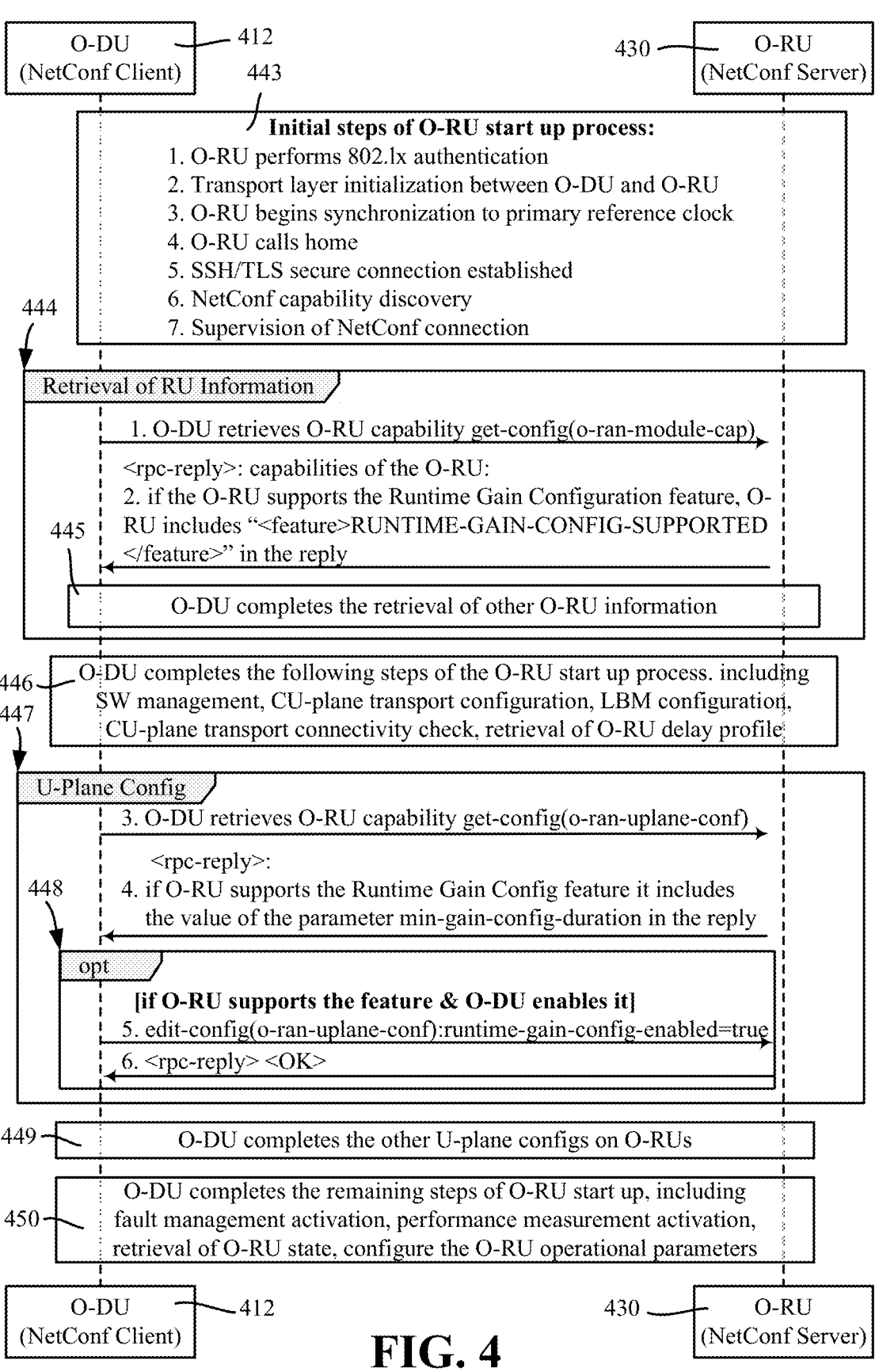

O-DU
(NetConf Client) —— 412
443

430 —— O-RU
(NetConf Server)

Initial steps of O-RU start up process:
1. O-RU performs 802.lx authentication
2. Transport layer initialization between O-DU and O-RU
3. O-RU begins synchronization to primary reference clock
4. O-RU calls home
5. SSH/TLS secure connection established
6. NetConf capability discovery
7. Supervision of NetConf connection

444

Retrieval of RU Information

1. O-DU retrieves O-RU capability get-config(o-ran-module-cap)

<rpc-reply>: capabilities of the O-RU:
2. if the O-RU supports the Runtime Gain Configuration feature, O-RU includes "<feature>RUNTIME-GAIN-CONFIG-SUPPORTED </feature>" in the reply

445

O-DU completes the retrieval of other O-RU information 446
447
O-DU completes the following steps of the O-RU start up process. including SW management, CU-plane transport configuration, LBM configuration, CU-plane transport connectivity check, retrieval of O-RU delay profile

U-Plane Config

3. O-DU retrieves O-RU capability get-config(o-ran-uplane-conf)

<rpc-reply>:
4. if O-RU supports the Runtime Gain Config feature it includes
   the value of the parameter min-gain-config-duration in the reply

448 opt

[if O-RU supports the feature & O-DU enables it]
5. edit-config(o-ran-uplane-conf):runtime-gain-config-enabled=true
6. <rpc-reply> <OK>

449

O-DU completes the other U-plane configs on O-RUs

450

O-DU completes the remaining steps of O-RU start up, including fault management activation, performance measurement activation, retrieval of O-RU state, configure the O-RU operational parameters O-DU
(NetConf Client) —— 412

430 —— O-RU
(NetConf Server)

FIG. 4

Table: 7.4.6.1 Slot Message frame format (Section Type 4)

| | 0 (msb) | 1 | 2 | 3 | 4 | 5 | 6 | 7 (lsb) | # of bytes | |
|---|---|---|---|---|---|---|---|---|---|---|
| | | | | Section Type 4: Slot-level Config | | | | | | |
| | | | | transport header (clause 5.1.3) | | | | | 1 | Octet 1 |
| | dataDirection | payloadVersion | | | | scs | | | 1 | Octet 9 |
| | | | | frameID | | | | | 1 | Octet 10 |
| | | | subframeId | | | | slotId | | 1 | Octet 11 |
| | slotId | | | | startSymbolID | | | | 1 | Octet 12 |
| | | | reserved | | | | cmdScope | | 1 | Octet 13 |
| | | | | sectionType = 4 | | | | | 1 | Octet 14 |
| | | | | numberOfST4Cmds | | | | | 1 | Octet 15 |
| | | | | reserved (8 bits) | | | | | 1 | Octet 16 |

RUNTIME DOWNLINK POWER CONFIGURATION USING CONTROL-PLANE MESSAGING

BACKGROUND

Various radio access network (RAN) operation scenarios require changing radio downlink power. For example, in citizens broadband radio service (CBRS), a spectrum access system (SAS) may require a general authorized access (GAA) radio unit to change the maximum downlink power to reduce the interference with an incumbent or priority access license (PAL) system. In addition to CBRS-specified power control, energy saving via power control is also highly advantageous in many scenarios.

The O-RAN (Open-RAN) Alliance has published open fronthaul interface multi-vendor specifications for an open-distributed unit (O-DU) and an open-radio unit (O-RU) to interoperate. The current O-RAN fronthaul specifications define configuring the O-RU transmit power through the fronthaul management plane (M-plane). However, this M-plane-based mechanism intends to function before the O-RU starts up, or after the service is stopped.

As a result, to change the power once the radio unit has started, the corresponding cell must be first locked. More particularly, the current O-RAN/M-plane solution for downlink power reconfiguration is done by a simple cell lock with deactivation (stopping downlink transmission) and then cell unlock with reactivation (resuming downlink transmission). In this case, service interruption is inevitable, which leads to performance degradation, and therefore customer dissatisfaction.

BRIEF DESCRIPTION OF THE DRAWINGS

The technology described herein is illustrated by way of example and not limited in the accompanying figures in which like reference numerals indicate similar elements and in which:

FIG. 3 is a representation of an example command structure and corresponding O-RAN control-plane parameters, in accordance with various aspects and implementations of the subject disclosure.

FIG. 4 is an example signaling/sequence and dataflow diagram showing O-RAN distributed unit (O-DU) and radio unit (O-RU) startup operations in a network that implements runtime dynamic downlink power configuration, in accordance with various aspects and implementations of the subject disclosure.

FIG. 6 is a representation of an example data structure for communicating timing data, in accordance with various aspects and implementations of the subject disclosure.

DETAILED DESCRIPTION

Figure 1:
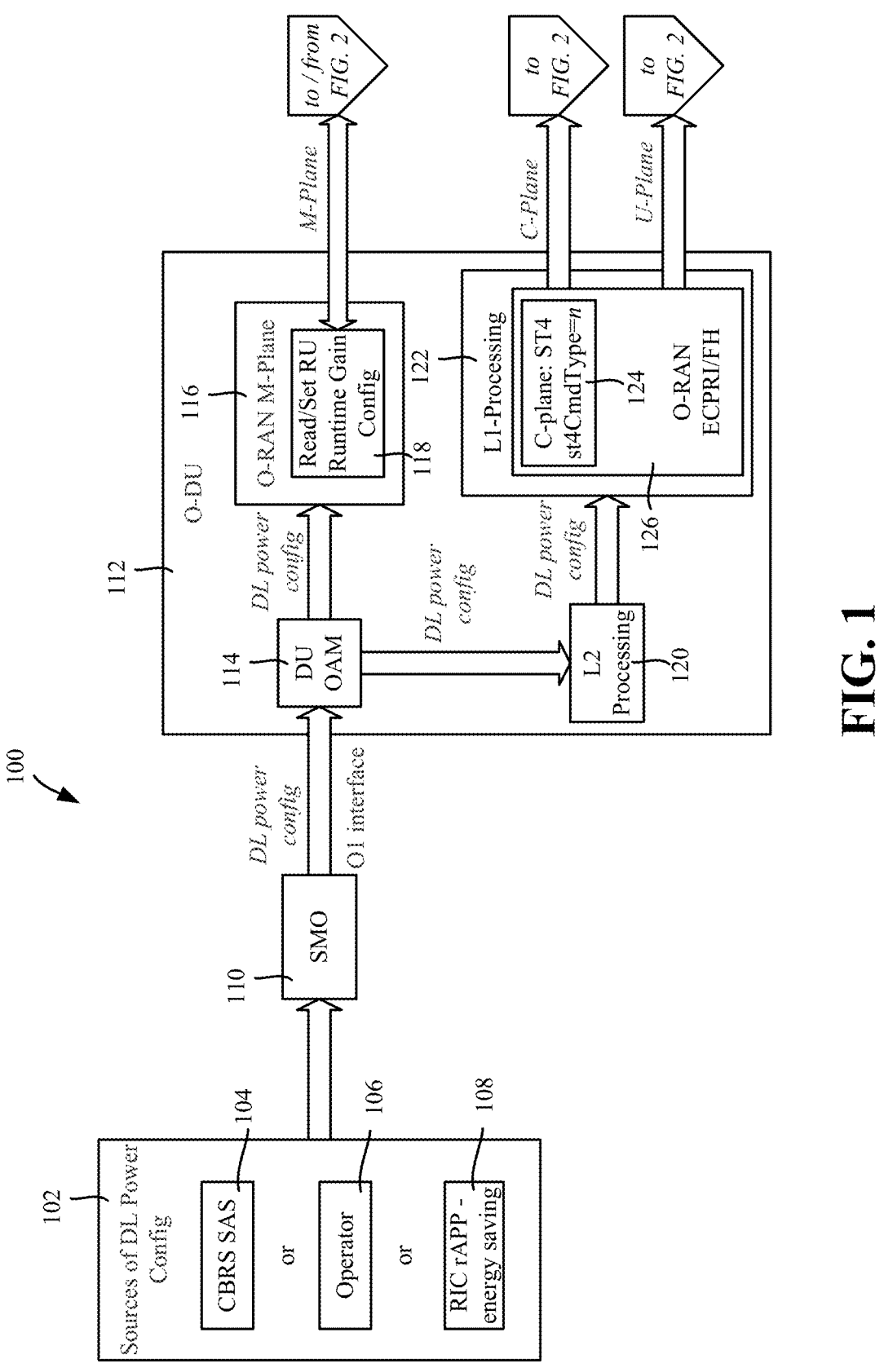
FIGS. 1 and 2 are an example block diagram representation of an example system in an open-radio access network (O-RAN) architecture in which runtime dynamic downlink power configuration is implemented, in accordance with various aspects and implementations of the subject disclosure.

Various aspects of the technology described herein are generally directed towards dynamically changing the transmit power configuration (power gain adjustment) during the runtime of a radio unit, that is, without stopping the radio unit and corresponding data communications service. In one example Open-Radio Access Network (O-RAN) based implementation, the distributed unit (O-DU) sends the gain value to the radio unit (O-RU) via a control-plane message; the O-DU specifies the exact time (e.g., in terms of frameId, subframeId, slotId, and startSymbolId) at which the O-RU is to start using the updated gain value. This allows the O-DU and the O-RU to change the power at the same specified time (the same symbol at which to start in synchronization), whereby the power configuration/reconfiguration is performed during runtime without any service interruption. Note that as used herein, changing or adjusting "DL power" is synonymous with changing or adjusting "DL gain."

In one example, the control-plane (C-plane) message changes the gain via a command type "GAIN_CONFIG" (e.g., for O-RAN-Section Type 4 compliant with the O-RAN standards) and associated parameters that allow the distributed unit to send the gain value to the radio unit. This is unlike existing solutions in which O-RAN management-plane (M-plane) "NetConf<edit-config>" is used, resulting in the cell having to be locked first (bringing down the service) to accomplish the power configuration change, followed by a cell unlock to restore service. As can be readily appreciated, power adjustment via the control-plane according to the technology described herein is significantly faster than management-plane-based configuration, and also significantly, does not require interrupting service. As will be understood, the power change is synchronized seamlessly between the O-DU and the O-RU, thereby supporting O-RU energy saving and performance improvement; further, this is particularly beneficial with Citizens Broadband Radio Service (CBRS) where downlink power adjustment can be frequently required by a spectrum access system (SAS).

Reference throughout this specification to "one embodiment," "an embodiment," "one implementation," "an implementation," etc. means that a particular feature, structure, or characteristic described in connection with the embodiment/implementation is included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations. It also should be noted that terms used herein, such as "optimization," "optimize" or "optimal" and the like (e.g., "maximize," "minimize" and so on) only represent objectives to move towards a more optimal state, rather than necessarily obtaining ideal results.

Aspects of the subject disclosure will now be described more fully hereinafter with reference to the accompanying drawings in which example components, graphs and/or operations are shown. In the following description, for purposes of explanation, numerous specific details are set forth in order to provide a thorough understanding of the various embodiments. However, the subject disclosure may be embodied in many different forms and should not be construed as limited to the examples set forth herein.

FIG. 1 shows an example system/architecture 100, which in this example is an O-RAN compliant architecture. In FIG. 1, nonlimiting example (potential) sources 102 that request downlink (DL) power configuration/reconfiguration changes include a citizens broadband radio service spectrum access system (CBRS SAS) 104 that can control citizens broadband radio spectrum, a mobile network operator 106, and/or a RAN intelligent controller (RIC) rAPP 108 (RAN application) that runs in the non-real time RIC layer, such as to manage radio unit energy saving, (e.g., by having the radio unit utilize power amplifier resizing to control the gain such as to reduce downlink power under low traffic conditions). One or more of these example sources 102 are coupled to a service management and orchestration framework (SMO 110) that hosts fault, configuration, accounting, performance, and security (FCAPS) functions, including providing an interface to the mobile network operator 106.

Figure 2:
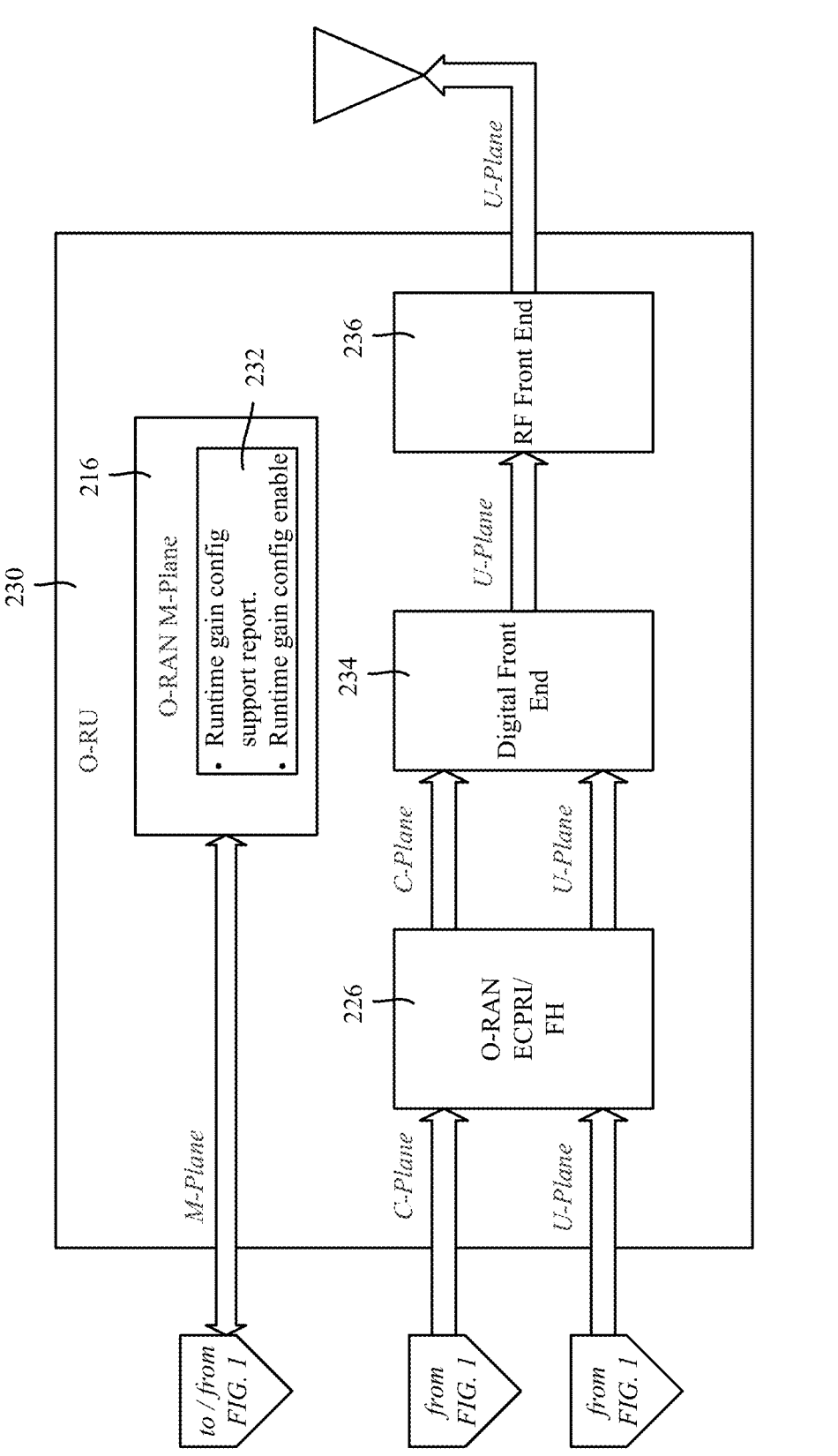

In turn, coupled to the SMO 110 is an O-RAN distributed unit 112 (O-DU) which is a logical node hosting a radio link control (RLC) layer, a medium access control (MAC) layer and the high component of the physical layer (PHY). In the example of FIGS. 1 and 2, the O-DU operations, administration and maintenance (DU OAM) 114 receives downlink power configuration (DL power config) data from the SMO 110, e.g., based on information from one of the sources 102, over the O-RAN-defined O1 interface. The DU OAM 114 provides the DL power config information to an O-RAN M-Plane (management plane) component 116 that among other operations, is configured (block 118) to communicate with the radio unit 230 (FIG. 2) to determine whether the radio unit can support dynamic runtime gain configuration as described herein. In general, the management plane is used for non-real-time management operations between the O-DU 112 and the O-RU 230. In the example of FIGS. 1 and 2, the radio unit 230 is able to support dynamic runtime gain configuration.

The DU OAM 114 provides the DL power config information to L2 processing 120, which communicates the DL power config information to L1 processing 122. The L1 processing 122 is configured as described herein to send a command (a C-Plane message) to the radio unit 230 (FIG. 2). In general, the control plane is used for real-time control between the O-DU 112 and the O-RU 230, (other than the IQ (real (I) and imaginary (Q) sample data which is part of the User Plane). More particularly, this C-Plane message is shown via block 124 as a C-plane ST4 message of st4CmdType=n command (e.g., n=a suitable value such as 5 to be assigned upon standardization by O-RAN); additional details of an example suitable command are described with reference to FIG. 3.

To communicate C-plane messages/commands, FIGS. 1 and 2 show the evolved Common Public Radio Interface (eCPRI) protocol used in fronthaul (FH) transport network communications; note that the interface between the DU and RU is also known as the fronthaul (FH) interface. This is represented via the O-DU ECPRI/FH (block 126) of FIG. 1 and the O-RU ECPRI/FH (block 226) of FIG. 2. Also shown in FIGS. 1 and 2 are user-plane (U-plane) communications via the O-RAN ECPRI/FHs 126 and 226, respectively.

As depicted in the example of FIG. 2, the radio unit 230 has a counterpart M-plane component 216 (coupled to the distributed unit's M-plane component 116 of FIG. 1) that is configured (block 232) to report that this radio unit supports runtime gain configuration, and can enable/disable (turn on or turn off) runtime gain configuration upon request. As such, because the O-DU 112 knows the O-RU 230 supports runtime gain configuration, when enabled the distributed unit can send the C-plane message to the O-RU, which is forwarded to the O-RU's digital front end component 232 and RF front end component 234. In general, the digital front end component 232 includes, for example, digital up converter, digital down converter, digital pre-distortion and crest factor reduction functions; the RF front end component 234 includes, for example, antenna element arrays, bandpass filters, power amplifiers, low noise amplifiers, digital-to-analog converters, and analog-to-digital converters.

As generally defined in O-RAN specifications (e.g., O-RAN WG4 Control, User and Synchronization Plane Specification, v11.00; note that the Synchronization Plane refers to traffic between the O-RU or O-DU to a synchronization controller), the DL gain is based on the difference of RF output level (DL power) to the IQ input level. For a fixed IQ input level (decibels relative to full scale, or dBFS), changing the RF output level is achieved by varying the DL gain, e.g., in the RF front end component 234.

To summarize the runtime gain config-related communications in the example implementation of FIG. 2, M-plane functions are provided to read the O-RU capabilities with respect to the runtime gain config feature, and to turn on/turn off the feature. Note that other ways to determine whether a radio unit supports the runtime gain config feature can be used, e.g., centrally maintained in a database or the like accessible to the SMO 110 or a centralized unit coupled to the distributed unit, and so on. However, the M-plane functions provide the ability to discover the feature and/or enable or disable the feature whenever a radio unit is started up (e.g., as described with reference to FIG. 4).

FIG. 3 shows a nonlimiting example of a C-plane command (message) 340 by which gain can be dynamically configured at the radio unit, e.g., a Section Type 4, st4CmdType=n, (e.g., n=xxxxxxxxb, such as 00000101b). In this example, the type is defined as "GAIN_CONFIG" with a meaning of a "Command specifying gain value (dB), meant for dynamic O-RU gain configurations use cases." Note that any of these values (e.g., Section Type 4, st4CmdType=n (e.g., such as n=5) and others described herein) are only practical examples and can be changed, e.g., by O-RAN standardization.

The parameters for setting the gain are shown in the nonlimiting example data structure (e.g., table) 342, which complies with the O-RAN WG4 Control, User and Synchronization Plane Specification, v11.00. More particularly, the transport header portion (first eight bytes), (clause 5.1.3), Section Type 4 section header (second eight bytes), and the Section Type 4 common part of the command header (third eight bytes) are compliant with the standards as shown in the example of FIG. 3. The gain data is based on the non-reserved fields following the common part. In this example, the O-RU is to calculate the gain value based on the equation:

$$gain = max - gain - gain\_offset\_mantissa * 10^{\wedge}(-4)$$

where "max-gain" is a mandatory M-plane parameter defined by the O-RU; the O-DU gets the value during the RU start up process. Note that $10^{\wedge}(-4)$ (i.e., $10^{-4}$) is used to match the same precision of the existing M-plane-defined gain, and further that the range of the gain_offset_mantissa is: 0: $(2^{\wedge}20-1*)10^{\wedge}(-4)$, (i.e., zero to: 104.8575).

FIG. 4 shows example details of an O-RU startup process, given an O-RAN distributed unit (NetConf client) 412 and an O-RAN radio unit (NetConf server) 412. Example initial steps of the O-RU start up process are shown in block 443, including:

1. O-RU performs 802.1x authentication
2. Transport layer initialization between O-DU and O-RU
3. O-RU begins synchronization to primary reference clock
4. O-RU calls home
5. SSH/TLS secure connection established
6. NetConf (NetConf protocol) capability discovery
7. Supervision of NetConf connection.

Following the initial steps, block 444 represents retrieval of the radio unit (RU) information, including labeled arrow one (1) via which the O-DU sends a request to retrieve the O-RU capability data, including "get-config (o-ran-module-cap)" in this example. If the O-RU supports the feature (which it does in this example), the O-RU reports this capability in the capability report (labeled arrow two (2)) to O-DU during the RU startup process, e.g., via the RUN-TIME-GAIN-CONFIG-SUPPORTED feature indicator (in the O-RAN O-RU o-ran-module-cap.yang model). Note that this can be added as an optional feature to the O-RAN WG4 FH Management Plane Specification:

```
module o-ran-module-cap {
    ...
    feature RUNTIME-GAIN-CONFIG-SUPPORTED {
        description
            "This leaf is used to indicate O-RU's support for runtime gain
            configuration by C-Plane message."
    }
    ...
}
```

With respect to backwards compatibility, if the O-RU does not support the runtime gain configuration feature, the O-RU will not include the "<feature>RUNTIME-GAIN-CONFIG-SUPPORTED</feature>" in its capability report at arrow two (2)., whereby the O-DU does not use the C-plane Section Type 4, st4CmdType=n "GAIN_CONFIG" command to configure the DL gain. Instead, the O-DU can use the existing M-Plane method to configure the O-RU gain, albeit with the undesirable service deactivation and reactivation.

Thus, via block 444, the O-DU learns if the O-RU supports the runtime gain configuration feature. Either way, as represented in FIG. 4 by block 445 the O-DU completes the retrieval of other O-RU information. As represented in FIG. 4 by block 446, the O-DU also completes the following steps of the O-RU start up process, including software (SW) management, centralized unit (CU)-plane transport configuration, loop-back protocol (LBM) configuration, CU-plane transport connectivity check, and retrieval of the O-RU delay profile.

As represented in FIG. 4 by U-Plane configuration block 447, at arrow three (3) the O-DU 412 requests retrieval of O-RU capability data with respect to user plane data, e.g., get-config (o-ran-uplane-conf). The <rpc-reply> is represented via arrow four (4), in which if the O-RU supports the runtime gain config feature, the O-RU includes the value of the minimum gain duration parameter "min-gain-config-duration" in the reply, referring to how long the RU needs to make a gain change. Example structures and corresponding information are shown in the tables below:

```
Tree structure of o-ran-uplane-conf.yang model
    +--rw user-plane-configuration
        ...
        +--ro tx-arrays* [name]
            ...
            | +--ro min-gain-config-duration? unit16 {feat:RUNTIME-GAIN-
            CONFIG-SUPPORTED}?
            ...
        +--rw general-config
            ...
            +--rw runtime-gain-config-enabled? Boolean
            feat:RUNTIME-GAIN-CONFIG-SUPPORTED}?
```

```
Definitions in the o-ran-uplane-conf.yang model
leaf min-gain-config-duration {
    if-feature feat:RUNTIME-GAIN-CONFIG-SUPPORTED;
    type unit16;
    config false;
    units Ts;
    description
        "Minimum gap required by the O-RU to change gain during runtime. During this gap,
    O-DU should not schedule any DL PRB."
    }
leaf runtime-gain-config-enabled {
    if-feature feat:RUNTIME-GAIN-CONFIG-SUPPORTED;
    type boolean;
    default false;
```

-continued

```
description
    "If O-RU indicates support for Section Type 4 command 'GAIN_CONFIG', O-DU may
    configure the O-RU to use Section Type 4 GAIN_CONFIG command by setting this
    flag to 'true'."
}
```

As represented in FIG. 4 block 448, at arrow five (5), if the O-RU 430 supports the feature and the O-DU 412 elects to use the runtime gain configuration feature, the O-DU 412 sets the runtime-gain-config-enabled=TRUE. When the O-DU 412 enables the feature, the radio unit 430 replies with an <OK> response, as represented via arrow six (6). At this time, in this example, dynamic gain configuration is enabled, and the O-DU 412 knows the minimum gain duration needed by the radio unit 430, (particularly via arrows two (2), four (4), five (5) and six (6)).

For completeness, block 449 O-DU 412 represents completing the other U-plane configurations on the O-RU 430. Block 450 O-DU represents the O-DU 412 completing the remaining steps of O-RU 430 startup, including fault management activation, performance measurement activation, retrieval of O-RU state and configuration of the O-RU's operational parameters.

Figure 5:
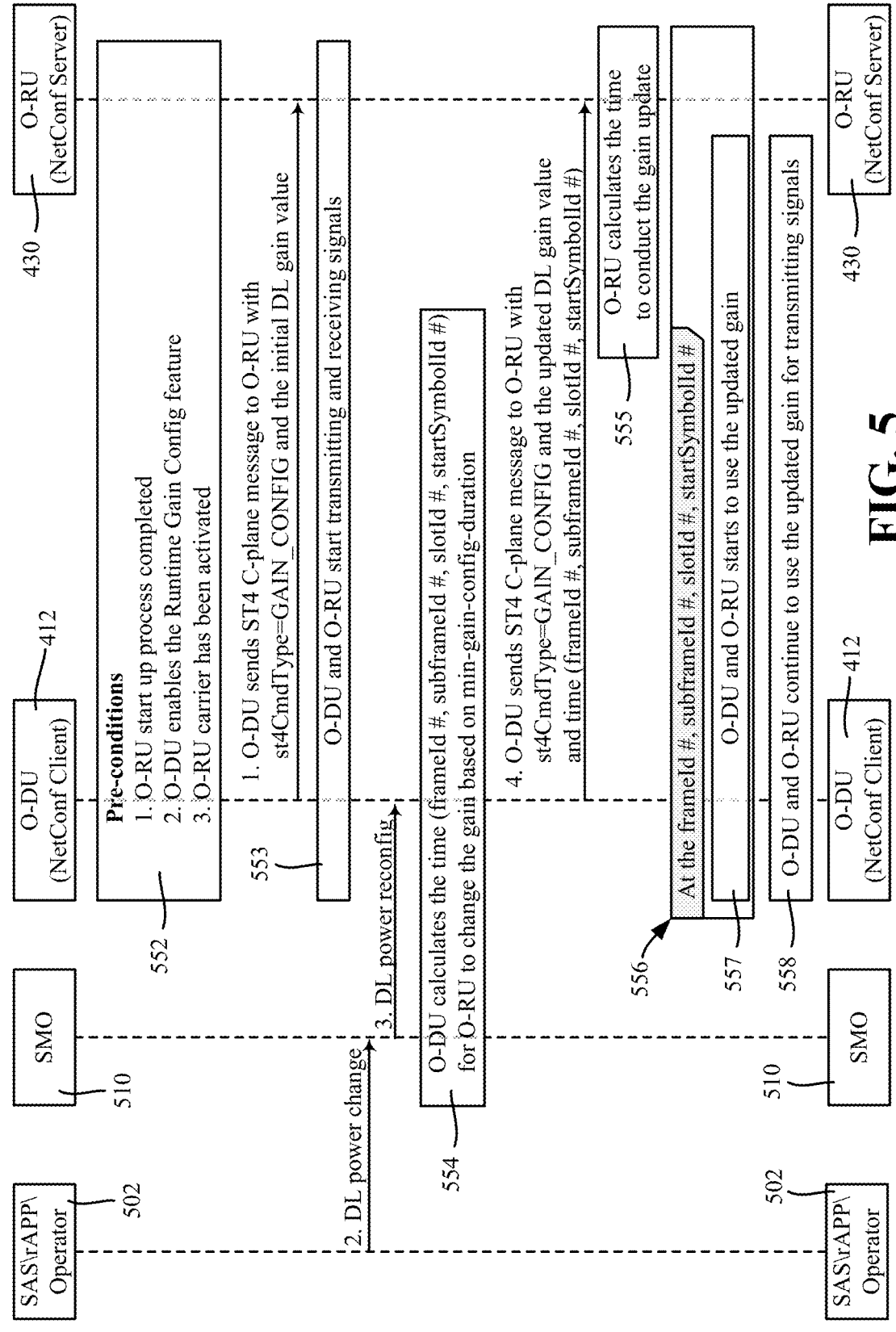
FIG. 5 is an example signaling/sequence and dataflow diagram O-DU and O-RU configuration operations in a network that implements runtime dynamic downlink power configuration, in accordance with various aspects and implementations of the subject disclosure.

FIG. 5 represents operations of the runtime dynamic downlink power configuration, subject to the preconditions in block 552, including that the O-RU start up process is completed, the O-DU 412 has enabled the runtime gain config feature (including that the O-DU 412 already has obtained the O-RU's reported min-gain-config-duration value) via the M-plane as described with reference to FIG. 4, and the O-RU carrier has been activated.

As part of starting the radio unit runtime, as represented in FIG. 5 by arrow one (1), the O-DU 412 sends an ST4 C-plane message to O-RU 430 with st4CmdType=GAIN_CONFIG and the initial DL gain value to be used. Note that although not explicitly shown in FIG. 5, this initial DL gain value can be determined by the O-DU based on one or more various factors, such as based on CBRS maximum downlink power needed to reduce interference. As represented by block 552, the O-DU 412 and O-RU 430 start transmitting and receiving signals.

As represented in FIG. 5 by arrow two (2), consider that in this example the downlink power gain change source 502 (e.g., the SAS/rAPP/Operator) sends a communication to the SMO 510 indicating that the downlink power gain needs to be changed. Arrow three (3) represents the SMO 510 forwarding the gain change data (DL power reconfig) to the O-DU 412.

In response to the gain change data message from the SMO 510, at block 554 the O-DU 412 calculates the time (frameId #, subframeId #, slotId #, startSymbolId #) for the O-RU 430 to change the gain. Note that the time data is based on min-gain-config-duration parameter value previously provided by the O-RU 430 to the O-DU 412 as part of the M-plane communications described with reference to FIG. 4.

Once determined, the O-DU 412 sends the ST4 C-plane message (e.g., FIG. 3) to the O-RU with st4CmdType=GAIN_CONFIG and the updated DL gain value and time (frameId #, subframeId #, slotId #, startSymbolId #) parameters, as represented in FIG. 5 by arrow four (4). At block 555, when the O-RU obtains the message, the O-RU calculates the time to conduct the gain update. The data structure 660 of FIG. 6 shows how the frameId #, subframeId #, slotId #, startSymbolId #parameter data can be communicated to the O-RU according to the O-RAN section type 4 specification.

When the change time is reached (blocks 556 and 557 of FIG. 5), the O-DU and O-RU change the DL gain simultaneously, that is, for the exact same symbol based on the [frameId #, subframeId #, slotId #, startSymbolId #] data values. The power change is done seamlessly at the runtime without any service interruption, based on the minimum gap (min-gain-config-duration) needed by the O-RU to change the gain during runtime; during this gap, the O-DU should not schedule any DL resources. As represented in FIG. 5 by block 558, the O-DU and O-RU continue to use the updated gain for transmitting signals. This can last indefinitely, that is, until the gain is subsequently changed, although it is feasible to have a gain change expire and automatically reset to a prior or default gain value.

Figure 7:
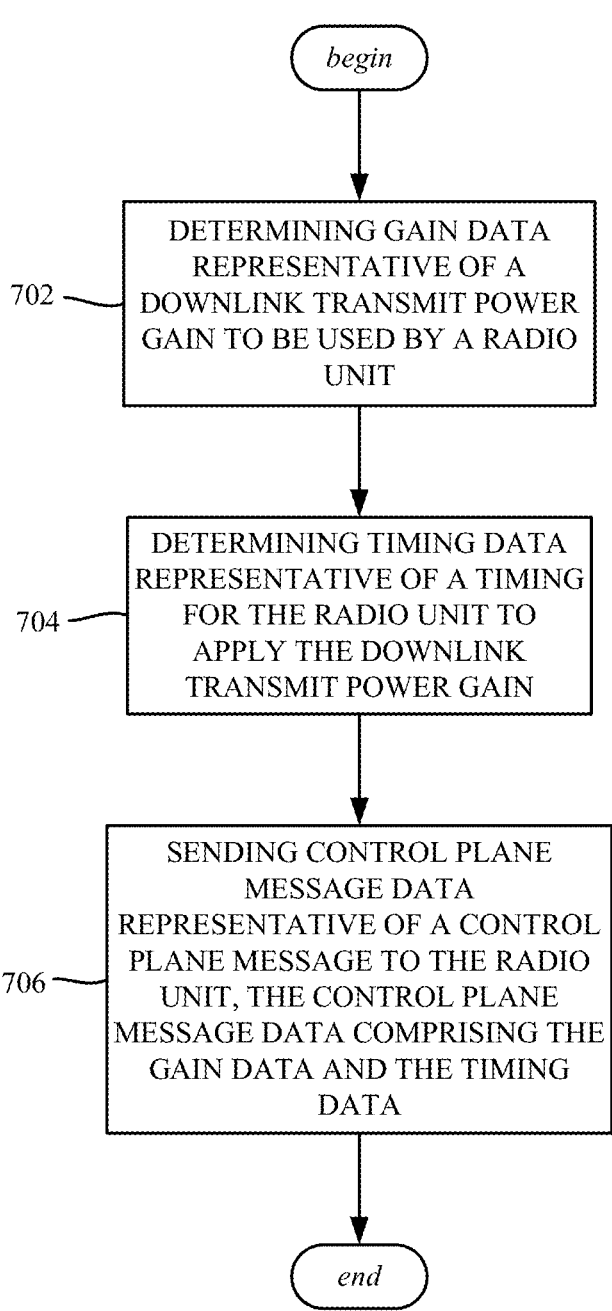
FIG. 7 is a flow diagram showing example operations related to sending control plane message data to a radio unit including gain data and timing data, in accordance with various aspects and implementations of the subject disclosure.

One or more aspects can be embodied in network equipment, such as represented in the example operations of FIG. 7, and for example can include a memory that stores computer executable components and/or operations, and a processor that executes computer executable components and/or operations stored in the memory. Example operations can include operation 702, which represents determining gain data representative of a downlink transmit power gain to be used by a radio unit. Example operation 704 represents determining timing data representative of a timing for the radio unit to apply the downlink transmit power gain. Example operation 706 represents sending control plane message data representative of a control plane message to the radio unit, the control plane message data including the gain data and the timing data.

Further operations can include, obtaining, prior to the sending of the control plane message data, radio unit capability data from the radio unit, the radio unit capability data including information indicating that the radio unit supports configuration of the downlink transmit power gain. Obtaining the radio unit capability data can include communicating with the radio unit via management plane messaging.

Obtaining the radio unit capability data can include communicating, to the radio unit, capability data request message data representative of a capability data request message, and receiving, in response to the capability data request message, a reply from the radio unit including gain configuration duration data representative of a gain configuration duration. Determining the timing data can be based on the gain configuration duration data.

Further operations can include avoiding scheduling of downlink resources to the radio unit during a timeframe corresponding to the gain configuration duration data.

The timing data can include at least one of: frame identification data representative of a frame identification, subframe identification data representative of a subframe identification, slot identification data representative of a slot identification, or start symbol identification data representative of a start symbol identification.

The network equipment can include a distributed unit.

The downlink transmit power gain data can include updated downlink transmit power data relative to previous radio unit and distributed unit transmit power data, and further operations can include determining a symbol number based on the timing data, and operating the distributed unit, starting at the symbol number, based on the updated transmit power data.

The control plane message data can be first control plane message data representative of a first control plane message, the downlink transmit power gain data can be first downlink transmit power gain data representative of a first downlink transmit power gain, the timing data can be first timing data representative of a first timing, and further operations can include operating a distributed unit based on the first downlink transmit power gain and the first timing data, determining second downlink transmit power gain data representative of a second downlink transmit power gain to be used by the radio unit, determining second timing data representative of a second timing for the radio unit to operate with the second downlink transmit power gain, sending, to the radio unit, second control plane message data representative of a second control plane message, the second control plane message data including the second downlink transmit power gain data and the second timing data, and operating the distributed unit based on the second downlink transmit power gain data and the second timing data.

Figure 8:
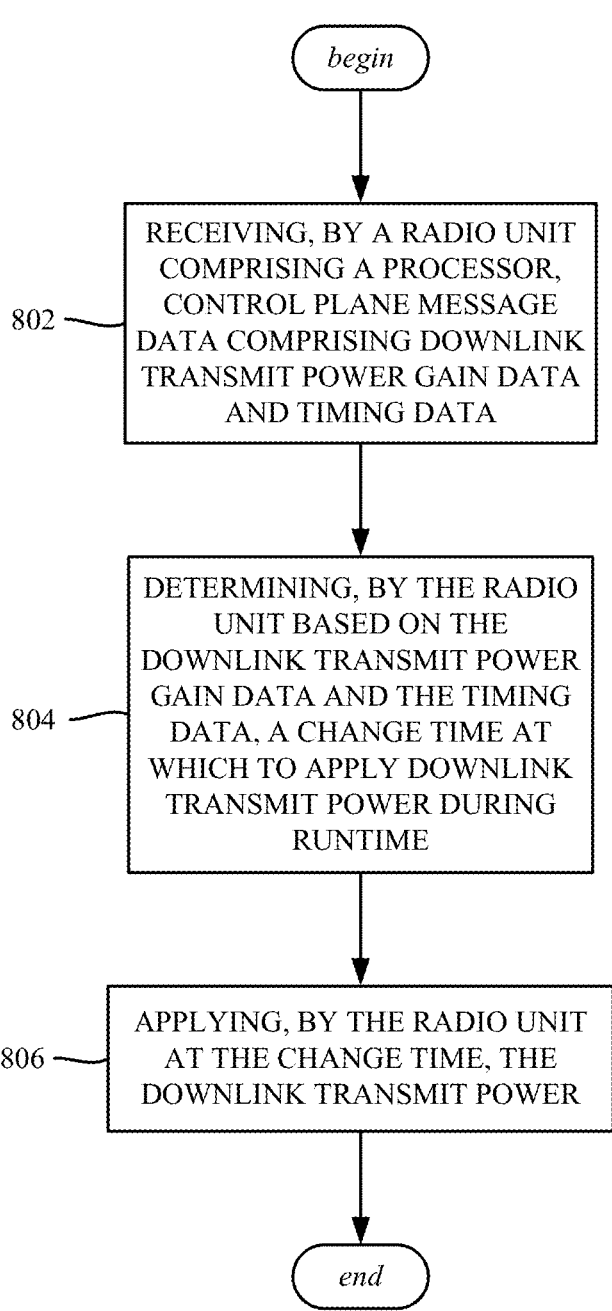
FIG. 8 is a flow diagram showing example operations related to a radio unit receiving and applying downlink transmit power gain data based on received timing data, in accordance with various aspects and implementations of the subject disclosure.

One or more example aspects, such as corresponding to example operations of a method, are represented in FIG. 8. Example operation 802 represents receiving, by a radio unit comprising a processor, control plane message data comprising downlink transmit power gain data and timing data. Example operation 804 represents determining, by the radio unit based on the downlink transmit power gain data and the timing data, a change time at which to apply downlink transmit power during runtime. Example operation 806 represents applying, by the radio unit at the change time, the downlink transmit power.

Further operations can include, prior to the receiving of the control plane message data, informing, by the radio unit, a distributed unit coupled to the radio unit that the radio unit is capable of supporting runtime changing of the downlink transmit power.

The timing data can include at least one of: frame identification data, subframe identification data, slot identification data, or start symbol identification data, and wherein the determining of the change time can include determining a symbol number for applying the transmit power.

Further operations can include communicating, by the radio unit to the distributed unit, gain configuration duration data.

The control plane message data can be first control plane message data, wherein the transmit power gain data can be first transmit power gain data, the timing data can be first timing data, the change time can be a first change time, the downlink transmit power can be first downlink transmit power, and further operations can include receiving, by the radio unit, second control plane message data comprising second downlink transmit power gain data and second timing data, determining, by the radio unit based on the second timing data, a second change time at which to apply second downlink transmit power during runtime based on the second downlink transmit power gain data, and applying, by the radio unit at the change time, the second downlink transmit power.

Figure 9:
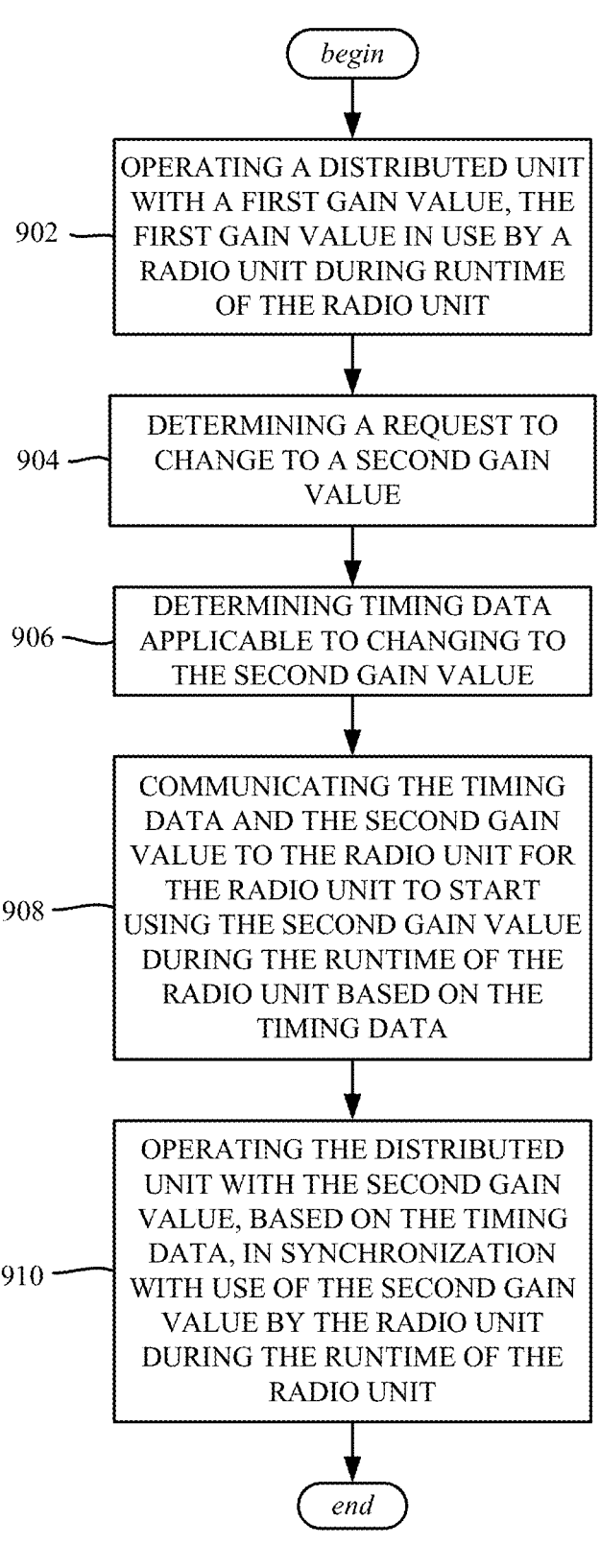
FIG. 9 is a flow diagram showing example operations related to operating a distributed unit with a first and second gain values in synchronization with a radio unit's use of the gain values, in accordance with various aspects and implementations of the subject disclosure.

FIG. 9 summarizes various example operations, e.g., corresponding to a machine-readable medium, comprising executable instructions that, when executed by a processor, facilitate performance of operations. Example operation 902 represents operating a distributed unit with a first gain value, the first gain value in use by a radio unit during runtime of the radio unit. Example operation 904 represents determining a request to change to a second gain value. Example operation 906 represents determining timing data applicable to changing to the second gain value. Example operation 908 represents communicating the timing data and the second gain value to the radio unit for the radio unit to start using the second gain value during the runtime of the radio unit based on the timing data. Example operation 910 represents operating the distributed unit with the second gain value, based on the timing data, in synchronization with use of the second gain value by the radio unit during the runtime of the radio unit.

Communicating the timing data and the second gain value to the radio unit can include sending a control plane command to the radio unit.

Further operations can include obtaining gain configuration duration data from radio unit, and determining the timing data based on the gain configuration duration data.

The radio unit can be synchronized in time with the distributed unit (e.g., the radio unit is synchronized in time with associated distributed unit when they are in mission mode), and further operations can include determining a starting symbol, based on the timing data, to start operating with the second gain value in synchronization with a counterpart starting symbol determined at the radio unit.

Further operations can include obtaining information indicating that the radio unit supports runtime gain configuration.

As can be seen, the technology described herein facilitates runtime gain adjustment, in which the power change is synchronized seamlessly between a distributed unit and a radio unit. Significantly, a SMO does not need to perform cell lock and unlock for downlink power reconfiguration. In one implementation, the technology described herein is O-RAN compliant via O-RAN C-plane and M-plane messages, which allows any vendors' O-DUs and O-RUs to interoperate properly with respect to the power adjustment functions. Backward compatibly is maintained for an O-RU that is not configured to support dynamic runtime gain adjustment.

Synchronization of gain configuration at the same symbol is provided by having the radio unit report its minimum gain configuration required timing gap, such that the O-DU can factor this gap time into the timing data sent in conjunction with the gain amount change data. More particularly, in O-RAN, the O-RU and the O-DU are synchronized, e.g., by the O-RAN fronthaul S-plane. Once the synchronization is established, the O-DU and O-RU know the exact timing with the reference to system frame number (SFN) pulse for each symbol; the combined values of frameId, subframeId, slotId, and startSymbolId provide the symbol number that the DL power configuration is to be applied, and because both the O-DU and the O-RU know the timing of the symbol reference to SFN (due to the synchronization), they can conduct the power configuration at the same time; (note that if the O-DU and O-RU are not aligned on the specific symbol that the updated gain takes effect, RF hardware saturation or performance degradation can occur). Further, an O-RU can be designed to gracefully ramp up or down downlink power, and therefore not destabilize RF frontend control loops.

Figure 10:
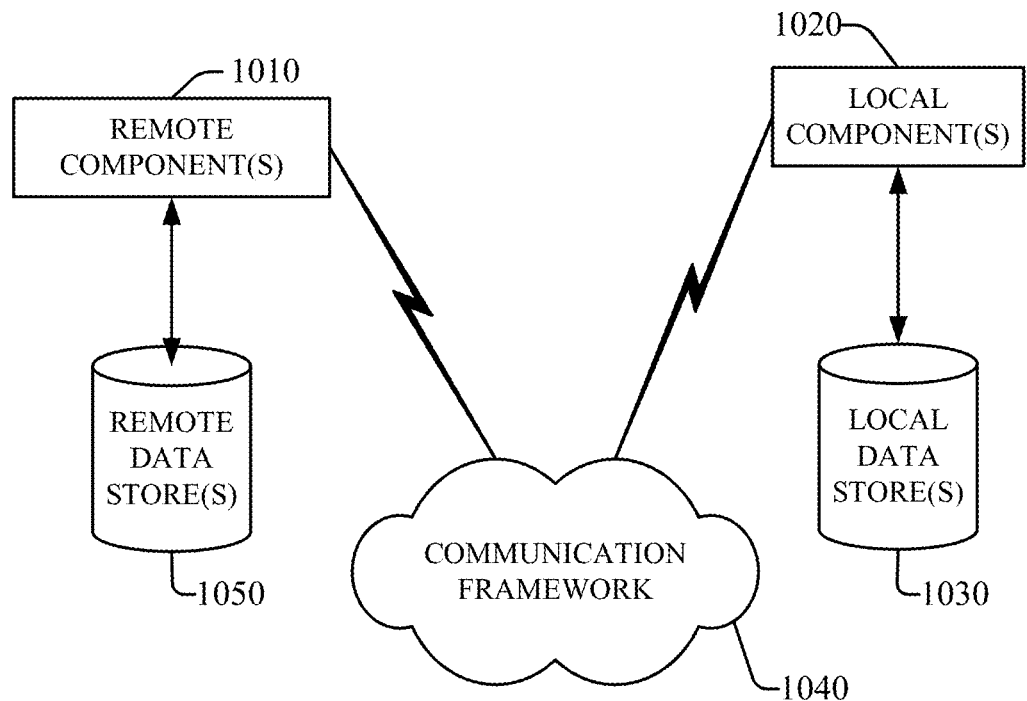
FIG. 10 is a block diagram representing an example computing environment into which aspects of the subject matter described herein may be incorporated.

FIG. 10 is a schematic block diagram of a computing environment 1000 with which the disclosed subject matter can interact. The system 1000 comprises one or more remote component(s) 1010. The remote component(s) 1010 can be hardware and/or software (e.g., threads, processes, computing devices). In some embodiments, remote component(s) 1010 can be a distributed computer system, connected to a local automatic scaling component and/or programs that use the resources of a distributed computer system, via communication framework 1040. Communication framework 1040 can comprise wired network devices, wireless network devices, mobile devices, wearable devices, radio access network devices, gateway devices, femtocell devices, servers, etc.

The system 1000 also comprises one or more local component(s) 1020. The local component(s) 1020 can be hardware and/or software (e.g., threads, processes, computing devices). In some embodiments, local component(s) 1020 can comprise an automatic scaling component and/or programs that communicate/use the remote resources 1010, etc., connected to a remotely located distributed computing system via communication framework 1040.

One possible communication between a remote component(s) 1010 and a local component(s) 1020 can be in the form of a data packet adapted to be transmitted between two or more computer processes. Another possible communication between a remote component(s) 1010 and a local component(s) 1020 can be in the form of circuit-switched data adapted to be transmitted between two or more computer processes in radio time slots. The system 1000 comprises a communication framework 1040 that can be employed to facilitate communications between the remote component(s) 1010 and the local component(s) 1020, and can comprise an air interface, e.g., Uu interface of a UMTS network, via a long-term evolution (LTE) network, etc. Remote component(s) 1010 can be operably connected to one or more remote data store(s) 1050, such as a hard drive, solid state drive, SIM card, device memory, etc., that can be employed to store information on the remote component(s) 1010 side of communication framework 1040. Similarly, local component(s) 1020 can be operably connected to one or more local data store(s) 1030, that can be employed to store information on the local component(s) 1020 side of communication framework 1040.

Figure 11:
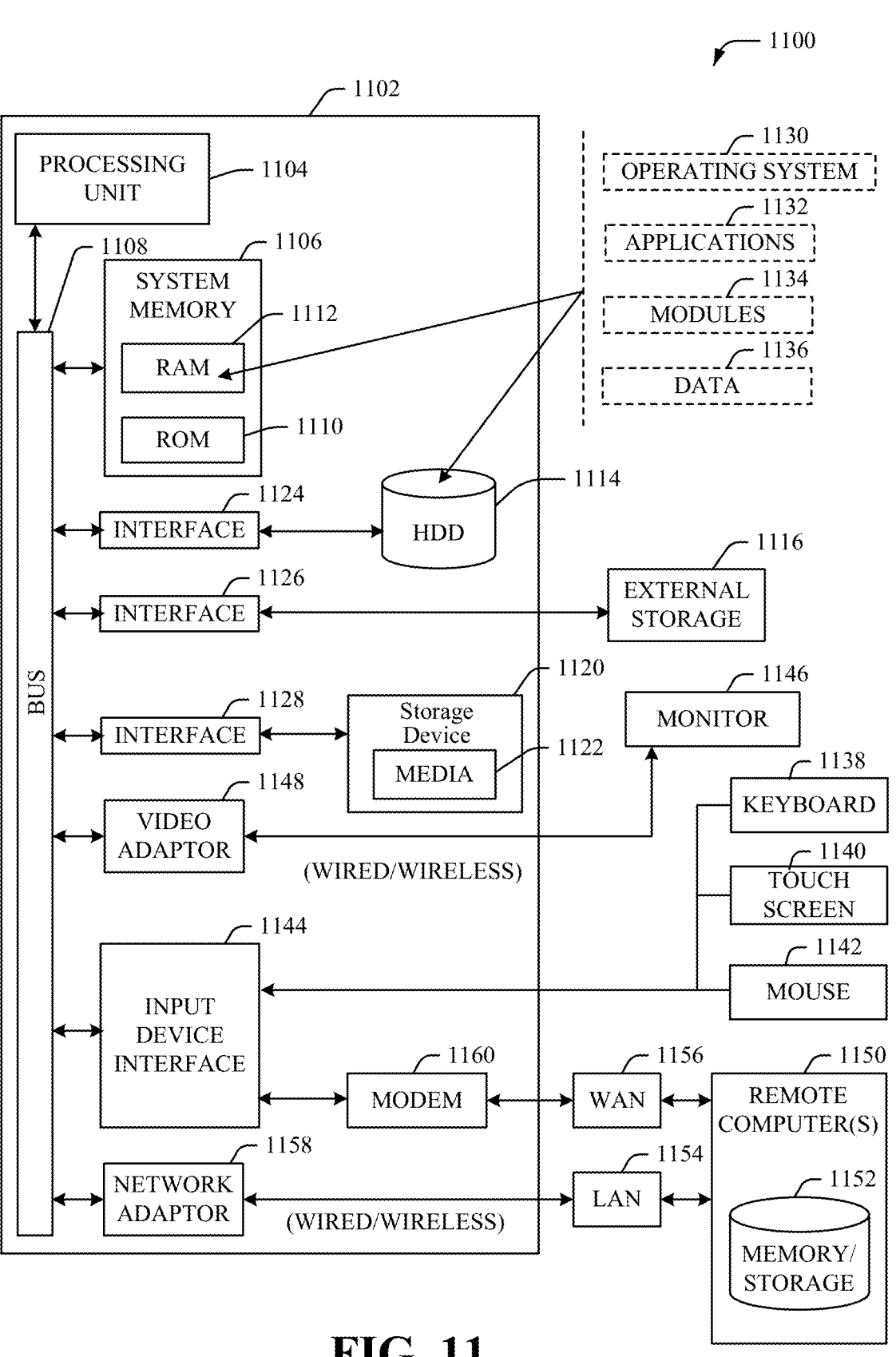
FIG. 11 depicts an example schematic block diagram of a computing environment with which the disclosed subject matter can interact/be implemented at least in part, in accordance with various aspects and implementations of the subject disclosure.

In order to provide additional context for various embodiments described herein, FIG. 11 and the following discussion are intended to provide a brief, general description of a suitable computing environment 1100 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments of the aspects described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), and can include one or more external storage devices 1116 (e.g., a magnetic floppy disk drive (FDD) 1116, a memory stick or flash drive reader, a memory card reader, etc.). While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114.

Other internal or external storage can include at least one other storage device 1120 with storage media 1122 (e.g., a solid state storage device, a nonvolatile memory device, and/or an optical disk drive that can read or write from removable media such as a CD-ROM disc, a DVD, a BD, etc.). The external storage 1116 can be facilitated by a network virtual machine. The HDD 1114, external storage device(s) 1116 and storage device (e.g., drive) 1120 can be connected to the system bus 1108 by an HDD interface 1124, an external storage interface 1126 and a drive interface 1128, respectively.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1194 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are examples and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. Network equipment, comprising:

a processor; and a memory that stores executable instructions that, when executed by the processor, facilitate performance of operations, the operations comprising:

determining gain data representative of a downlink transmit power gain to be used by a radio unit;

determining timing data representative of a timing for the radio unit to apply the downlink transmit power gain; and sending control plane message data representative of a control plane message to the radio unit, the control plane message data comprising the gain data and the timing data.

2. The network equipment of claim 1, wherein the operations further comprise obtaining, prior to the sending of the control plane message data, radio unit capability data from the radio unit, the radio unit capability data comprising information indicating that the radio unit supports configuration of the downlink transmit power gain.

3. The network equipment of claim 2, wherein the obtaining of the radio unit capability data comprises communicating with the radio unit via management plane messaging.

4. The network equipment of claim 1, wherein the obtaining of the radio unit capability data comprises communicating, to the radio unit, capability data request message data representative of a capability data request message, and receiving, in response to the capability data request message, a reply from the radio unit comprising gain configuration duration data representative of a gain configuration duration.

5. The network equipment of claim 4, wherein the determining of the timing data is based on the gain configuration duration data.

6. The network equipment of claim 5, wherein the operations further comprise avoiding scheduling of downlink resources to the radio unit during a timeframe corresponding to the gain configuration duration data.

7. The network equipment of claim 1, wherein the timing data comprises at least one of: frame identification data representative of a frame identification, subframe identification data representative of a subframe identification, slot identification data representative of a slot identification, or start symbol identification data representative of a start symbol identification.

8. The network equipment of claim 1, wherein the network equipment comprises a distributed unit.

9. The network equipment of claim 1, wherein the downlink transmit power gain data comprises updated downlink transmit power data relative to previous radio unit and distributed unit transmit power data, and wherein the operations further comprise determining a symbol number based on the timing data, and operating the distributed unit, starting at the symbol number, based on the updated transmit power data.

10. The network equipment of claim 1, wherein the control plane message data is first control plane message data representative of a first control plane message, wherein the downlink transmit power gain data is first downlink transmit power gain data representative of a first downlink transmit power gain, wherein the timing data is first timing data representative of a first timing, and wherein the operations further comprise:

operating a distributed unit based on the first downlink transmit power gain and the first timing data;

determining second downlink transmit power gain data representative of a second downlink transmit power gain to be used by the radio unit;

determining second timing data representative of a second timing for the radio unit to operate with the second downlink transmit power gain;

sending, to the radio unit, second control plane message data representative of a second control plane message, the second control plane message data comprising the second downlink transmit power gain data and the second timing data; and operating the distributed unit based on the second downlink transmit power gain data and the second timing data.

11. A method comprising:

receiving, by a radio unit comprising a processor, control plane message data comprising downlink transmit power gain data and timing data;

determining, by the radio unit based on the downlink transmit power gain data and the timing data, a change time at which to apply downlink transmit power during runtime; and applying, by the radio unit at the change time, the downlink transmit power.

12. The method of claim 11, further comprising, prior to the receiving of the control plane message data, informing, by the radio unit, a distributed unit coupled to the radio unit that the radio unit is capable of supporting runtime changing of the downlink transmit power.

13. The method of claim 11, wherein the timing data comprises at least one of: frame identification data, subframe identification data, slot identification data, or start symbol identification data, and wherein the determining of the change time comprises determining a symbol number for applying the transmit power.

14. The method of claim 11, further comprising communicating, by the radio unit to the distributed unit, gain configuration duration data.

15. The method of claim 11, wherein the control plane message data is first control plane message data, wherein the transmit power gain data is first transmit power gain data, wherein the timing data is first timing data, wherein the change time is a first change time, wherein the downlink transmit power is first downlink transmit power, and further comprising:

receiving, by the radio unit, second control plane message data comprising second downlink transmit power gain data and second timing data;

determining, by the radio unit based on the second timing data, a second change time at which to apply second downlink transmit power during runtime based on the second downlink transmit power gain data; and applying, by the radio unit at the change time, the second downlink transmit power.

16. A non-transitory machine-readable medium, comprising executable instructions that, when executed by a processor, facilitate performance of operations, the operations comprising:

operating a distributed unit with a first gain value, the first gain value in use by a radio unit during runtime of the radio unit;

determining a request to change to a second gain value;

determining timing data applicable to changing to the second gain value;

communicating the timing data and the second gain value to the radio unit for the radio unit to start using the second gain value during the runtime of the radio unit based on the timing data; and operating the distributed unit with the second gain value, based on the timing data, in synchronization with use of the second gain value by the radio unit during the runtime of the radio unit.

17. The non-transitory machine-readable medium of claim 16, wherein the communicating of the timing data and the second gain value to the radio unit comprises sending a control plane command to the radio unit.

18. The non-transitory machine-readable medium of claim 16, wherein the operations further comprise obtaining gain configuration duration data from radio unit, and determining the timing data based on the gain configuration duration data.

19. The non-transitory machine-readable medium of claim 16, wherein the radio unit is synchronized in time with the distributed unit, and wherein the operations further comprise determining a starting symbol, based on the timing data, to start operating with the second gain value in synchronization with a counterpart starting symbol determined at the radio unit.

20. The non-transitory machine-readable medium of claim 16, wherein the operations further comprise obtaining information indicating that the radio unit supports runtime gain configuration.

*    *    *    *    *